Patented June 30, 1953

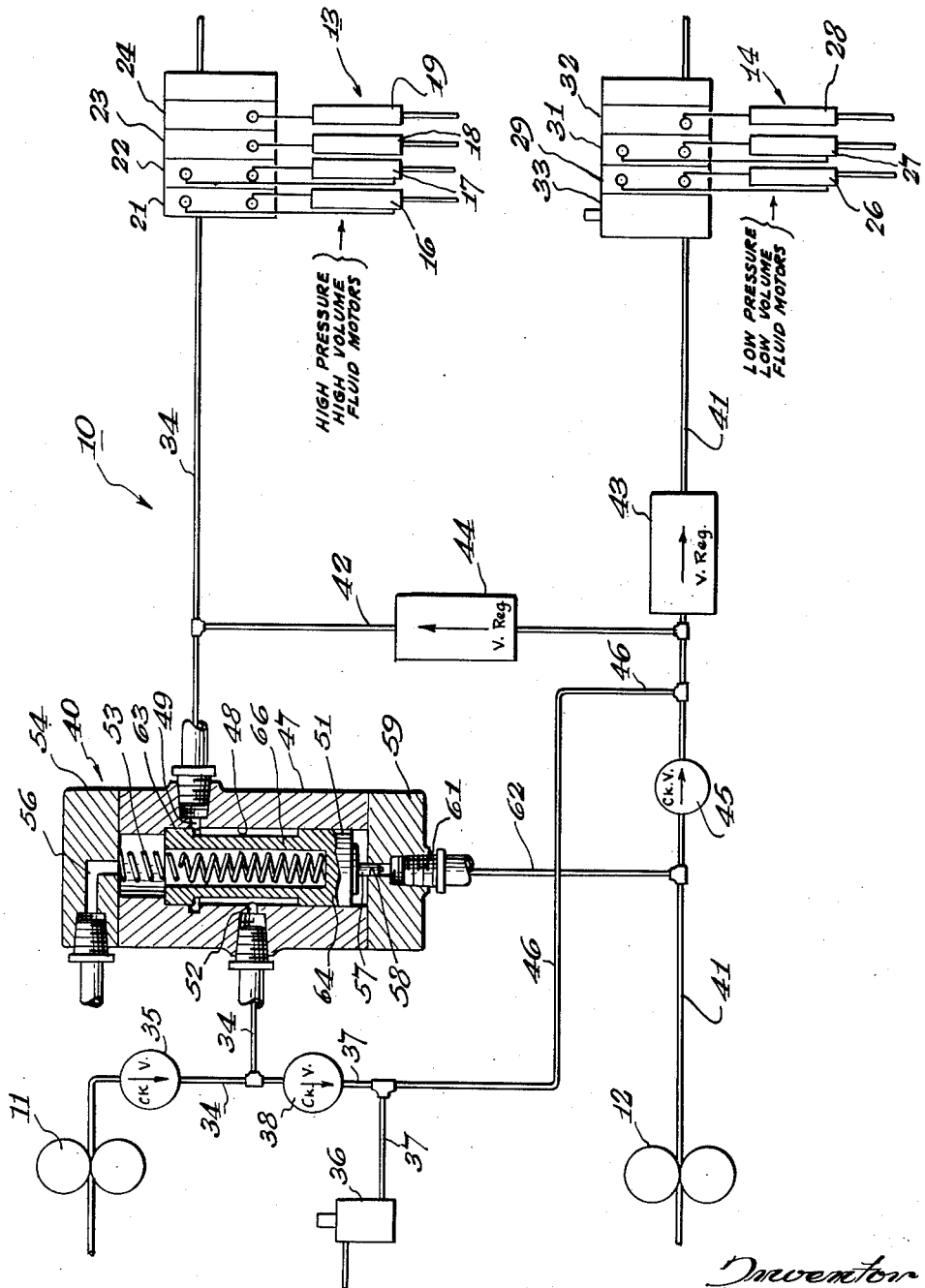

2,643,516

UNITED STATES PATENT OFFICE 2,643,516

FLUID PRESSURE SYSTEM

Melvin G. Carlson, Chicago, Ill., assignor to Goodman Manufacturing Company, Chicago, Ill., a corporation of Illinois Application December 8, 1951, Serial No. 260,740

9 Claims. (Cl. 60—52)

This invention relates generally to fluid pressure systems employing a pair of pumps for supplying pressure fluid, and more particularly to an improved arrangement wherein the system and the fluid motors connected therein may continue to operate after failure of one of the pumps.

According to the present invention a fluid pressure system is provided with a pair of fluid pressure pumps, each operating to supply a share of the pressure fluid necessary to operate fluid motors connected in the system. One group of such motors operates at high pressure and high volumes necessary, by way of example, for control of lifting and swinging functions of the gathering and discharge sections of a material gathering and loading machine, and the other group of such motors operates at relatively lower pressures and volumes for the control of the tramming and clutching functions of such a machine. In the invention herein, both of the pumps supply sufficient fluid for such operations, the output from a first pump being connected to supply the high pressure, high volume motors, the output from a second pump being apportioned to supply both groups of motors, the system being so designed that upon failure of either pump the pressure fluid is apportioned between both groups of motors, so that continued operation is had, albeit at a somewhat reduced rate, a shuttle or switch-over valve being caused to operate automatically according to failure of one of the pumps.

It is a principal object of this invention to provide a fluid pressure system employing a pair of pumps to supply pressure fluid, the system being capable of at least emergency operation upon failure of one or the other of such pumps.

Another object is to afford a simple fluid pressure system having a pair of pumps, and wherein the output of one pump is apportioned to different branches of the system, and wherein the output of the other pump may automatically be apportioned to the different branches of the system upon failure of the one pump.

Other objects and important features of the invention will be apparent from a study of the within specification taken with the drawing which together show a preferred embodiment of the invention and what is now considered to be the best mode of practicing the principles thereof. Other embodiments may be suggested to those having the benefit of the teachings herein, and it is therefore intended that the invention not be limited by the precise embodiment shown nor otherwise than by the scope and spirit of the claims appended to this specification.

The drawing illustrates a preferred embodiment of the invention and shows a fluid pressure system referred to generally by the reference numeral 10, the system including a pump 11 and a pump 12 connected, as will be shown, to supply pressure fluid to a bank of relatively high pressure and high volume fluid motors indicated generally by the reference numeral 13 and to a bank of relatively low pressure and low volume fluid motors indicated by the reference numeral 14.

The bank of high pressure motors 13 comprises double acting motors 16 and 17 and single acting motors 18 and 19 which are controlled respectively by control valves 21, 22, 23 and 24. The said control valves and their associated motors may be, by way of example, employed for the lifting and swinging functions of the gathering and discharge sections of a material gathering and loading machine.

The bank of low pressure motors 14 comprises double acting motors 26 and 27 and a single acting motor 28 which are controlled respectively by control valves 29, 31 and 32. The pressure at which fluid is admitted to the several motors 26, 27 and 28 is held below a top limit by a pressure relief valve 33 which in the case here may be set at a value of 250 p. s. i.

The output of pump 11 is connected by a pressure line 34 to the control valves 21 to 24. The back pressure against the pump 11 is controlled by a master relief valve 36, set preferably at a value of the order of 900 p. s. i., and connected by a pressure line 37 branching from the output pressure line 34 and having a check valve 38 therein preventing flow back to the pump 11 upon failure thereof. The pressure line 34 also has a similar check valve 35 therein, positioned between a pressure responsive valve 40 and the pump 11 for preventing flow back to the pump 11 upon failure thereof and under conditions as will appear as this specification proceeds. The control valves 21 to 24, however, are designed to afford substantially little or no resistance to flow of pressure fluid from the pump 11 when said valves are in the neutral position, thus maintaining the no load back pressure against pump 11 at a minimum. The upper limit of back pressure against the pump 11 upon the operation of the motors 16 to 19 is therefore controlled by the master relief valve 36.

The output from the pump 12 is delivered to a pressure line 41 having a check valve 45 preventing flow back to the pump 12 upon failure thereof. The output from the pump 12 is also supplied to a pressure line 42 branching from the pressure line 41 and connected to the pressure line 34 at a point between the fluid motors 13 and the pressure responsive valve 40, said pressure responsive valve 40 being for a purpose as will appear as this specification proceeds.

The control valves 29, 31 and 32 are designed to afford substantially no back pressure against the pump 12 when in the neutral position. The pressure relief valve 33 permits only of a maximum working pressure for the fluid motors 29, 31 and 32, which has been stated to be of the order of 250 p. s. i. The pressure in the line 41 upon operation of the said motors creates at the same time a back pressure against the pump 12 which back pressure is relieved by the master relief valve 36, there being a line 46 branching from the pressure line 41 and connected to the line 37 connecting with the master relief valve 36.

The quantity of pressure fluid required by the fluid motors 14 is considerably less than that required by the fluid motors 13, and the excess of pressure fluid supplied by the pump 12 is apportioned to the fluid motors 13. To this end the pressure lines 41 and 42 are provided respectively with flow regulating valves 43 and 44. The precise form of these valves is unimportant except as they may be claimed as part of a combination hereof, but in the instant case are designed to give a maximum flow of six G. P. M. each. It may be noted that each pump is designed to give a flow of eleven G. P. M., and so under condition when the valves 29, 31 and 32 are in neutral position, the flow regulator valve 43 will permit six G. P. M. to be spilled to tank.

The remaining five G. P. M. passes through flow regulator valve 44 to augment the output of the pump 11 and give a total of sixteen G. P. M. available for the fluid motors 13.

The pumps 11 and 12 are thus adapted to supply fluid under pressure to the fluid motors associated with each as heretofore explained. The pressure responsive valve 40 provides for redirecting of the pressure fluid upon failure of one of the pumps, so that the remaining pump will supply pressure fluid to both tanks of fluid motors. The valve 40 comprises a valve body 47 having a bore 48 therein intersected by spaced ports 49 and 52, port 49 being considered as an outlet port and connected to pressure line 34, and port 52 being considered as an inlet port connected to the pressure line 34 to the output of pump 11. A hollow spool valve member 51 is slidable in the bore 48 and is urged in one direction by a spring 53 bottomed at one end within the hollow spool 51 and at the other end on an end cap 54 secured to the valve body 47 in any convenient manner. A passageway 56 in the end cap 54 bleeds any fluid passing the spool member 51 to tank, as shown.

The spool valve member 51 is formed with a piston-like extension 57 opposite from the spring 53. The piston-like extension 57 fits within a bore 58 formed in an opposite end cap 59, also secured to the valve body 47 in any convenient manner. A pressure port 61 in the end cap 59 is connected by a pressure line 62 to the output of the pump 12 and between the pump 12 and the check valve 45.

The spool valve member 51 is also formed with end lands 63 and 64 and with a portion 66 between the lands 63 and 64 of diameter less than the diameter of the bore 48, so that when pressure is exerted against the piston extension 57 at the port 61 by the pump 12, pressure fluid from the pump 11 may flow from port 52 to port 49.

Under conditions when both pumps are functioning properly, the pressure responsive valve 40 will be in the position shown in the drawing, the pressure from pump 12 holding the spool member 51 in the position shown, the valve 40 passing fluid from pump 11 to the fluid motors 13. At the same time pump 12 will supply fluid to motors 14, the output from pump 12 being apportioned by the flow regulator valves 43 and 44 to supply also fluid motors 13.

In the event of failure of pump 12, pressure will no longer obtain at the port 61 and the spool valve member 51 will move by the force of spring 53 to a position lapping the port 49. Under such condition pressure fluid will be supplied by pump 12 by way of pressure line 46, the fluid being apportioned to the fluid motors 13 and 14 by the flow regulator valves 44 and 43 respectively.

In the event of failure of pump 11, pressure fluid will continue to be supplied by pump 12 to both banks of fluid motors, the flow thereto being apportioned by the flow regulator valves 43 and 44. The check valve 38 under such condition prevents by-passing of the flow regulators through the valve 40, while the check valve 35 prevents the back flow through the valve 40 which might be effective to operate the pump 11 as a motor.

The invention has been described in terms of a preferred embodiment thereof, but it is not intended that the invention be limited by the embodiment herein shown, other embodiments being reserved especially as they fall within the scope and purview of the claims here appended.

What is claimed is:

1. In a fluid pressure system, a fluid pressure motor operable at relatively high volumes, a fluid pressure motor operable at relatively low volume, a pair of pumps for supplying pressure fluid to said motors, a pressure line connecting the output of one of said pumps to said high pressure motor, a pressure line connecting the output of the second of said pumps to said low pressure motor, a branching line from the output of said second pump connected to said first named pressure line, a flow regulating valve connected in said branching line, a flow regulating valve connected in said second named pressure line between said branching line and said low volume fluid motor, said flow regulating valves apportioning the output from said second pump between said motors, and valve means including a valve body having a bore therein with spaced ports connected in the first named pressure line, a valve member movable in said bore and subject to pressure from the output of said second pump to unlap said spaced ports for passage of pressure fluid through said valve body from said first pump to said high volume motor, said valve member being movable upon failure of said second pump to lap said spaced ports and to pass pressure fluid from the said first pump to the output side of said second pump to be apportioned between said fluid motors, whilst bypassing said valve means.

2. In a fluid pressure system, a fluid pressure motor operable at relatively high volume, a fluid pressure motor operable at relatively low volume, a first and second pump for supplying pressure fluid to said motors, pressure lines connecting the output of said pumps to said motors, a branching line from the output of the second pump connected to the pressure line from said first pump, a flow regulating valve connected in said branching line, a flow regulating valve connected in the pressure line from said second pump and between said branching line and said low volume fluid motor, said flow regulating valves apportioning the output from said second pump between said motors, and valve means having a valve member therein subject to pressure from said second pump and movable to a position under such pressure where the output of said first pump is connected through said valve to said high volume fluid motor, said valve member being movable upon failure of said second pump to port pressure fluid from the said first pump to the output side of said second pump to be apportioned between said fluid motors.

3. In a fluid pressure system, a fluid pressure motor operable at relatively high volume, a fluid pressure motor operable at relatively low volume, a first and second pump for supplying pressure fluid to said motors, pressure lines connecting the output of said pumps to said motors, a branching line from the output of the second pump connected to the pressure line from said first pump, a flow regulating valve connected in said branching line, a flow regulating valve connected in the pressure line from said second pump and between said branching line and said low volume fluid motor, said flow regulating valves apportioning the output from said second pump between said motors, and valve means connected in the output pressure line from the first pump and operable upon failure of said second pump to cause the output of said first pump to be diverted to the output side of said second pump and to be apportioned between said fluid motors whilst bypassing said valve means.

4. In a fluid pressure system, a fluid pressure motor operable at relatively high volume, a fluid pressure motor operable at relatively low volume, a first and second pump for supplying pressure fluid to said motors, pressure lines connecting the output of said pumps to said motors, a branching line from the output of the second pump connected to the pressure line from said first pump, a flow regulating valve connected in said branching line, a flow regulating valve connected in the pressure line from said second pump and between said branching line and said low volume fluid motor, said flow regulating valves apportioning the output from said second pump between said motors, and valve means operable upon the failure of the said second pump to cause the other pump to apportion its output between said fluid motors whilst bypassing said valve means.

5. In a fluid pressure system, a fluid pressure motor operable at relatively high volume, a fluid pressure motor operable at relatively low volume, a first and second pump for supplying pressure fluid to said motors, the second of said pumps having flow regulating valves connected in the output thereof for apportioning its output between said fluid motors, the first of said pumps during normal operation thereof being connected to said high volume fluid motor, and valve means having a valve member therein subject to pressure from said second pump and movable to a position under such pressure where the output of said first pump is connected through said valve to said high volume fluid motor, said valve member being movable upon failure of said second pump to pass pressure fluid from the said first pump to the output side of said second pump to be apportioned between said fluid motors.

6. In a fluid pressure system, a fluid pressure motor operable at relatively high volume, a fluid pressure motor operable at relatively low volume, a first and second pump for supplying pressure fluid to said motors, the second of said pumps having flow regulating valves connected in the output thereof for apportioning its output between said fluid motors, the first of said pumps during normal operation thereof being connected to said high volume fluid motor, and valve means connected in the output of said first pump and operable upon failure of said second pump to cause the output of said first pump to be diverted to the output side of said second pump and to be apportioned between said fluid motors.

7. In a fluid pressure system, a fluid pressure motor operable at relatively high volume, a fluid pressure motor operable at relatively low volume, a first and second pump for supplying pressure fluid to said motors, the second of said pumps having flow regulating means connected in the output thereof for apportioning said output between said fluid motors, and valve means operable upon the failure of the said second pump to cause the first pump to apportion its output between said fluid motors.

8. A fluid pressure system according to claim 7 wherein a check valve is connected in the output side of said first pump for preventing said first pump from acting as a motor upon failure thereof by pressure fluid supplied from said second pump.

9. A fluid pressure system according to claim 7 wherein a check valve is connected in the output side of said second pump for preventing said second pump from acting as a motor upon failure thereof by pressure fluid supplied from said first pump.

MELVIN G. CARLSON.

References Cited in the file of this patent

UNITED STATES PATENTS

| Number | Name | Date |
|---|---|---|
| 2,570,342 | Harrington | Oct. 9, 1951 |